United States Patent [19]

Soshea et al.

[11] Patent Number: 5,563,938
[45] Date of Patent: Oct. 8, 1996

[54] SUBSCRIBER TELEPHONE DIVERTER SWITCH

[75] Inventors: Richard W. Soshea, Snohomish; Raymond Ma, Redmond, both of Wash.

[73] Assignee: Teltone Corporation, Bothell, Wash.

[21] Appl. No.: 418,532

[22] Filed: Apr. 7, 1995

[51] Int. Cl.⁶ .................................................... H04M 3/42
[52] U.S. Cl. ........................ 379/201; 379/120; 379/140; 379/156; 379/106
[58] Field of Search ................................ 379/219, 220, 379/221, 201, 211, 212, 120, 140, 156, 258, 64, 65, 66, 106

[56] References Cited

U.S. PATENT DOCUMENTS

| | | | |
|---|---|---|---|
| 3,922,491 | 11/1975 | Björk et al. | 379/94 |
| 4,441,180 | 4/1984 | Schüssler | 370/3 |
| 4,565,903 | 1/1986 | Riley | 379/201 |
| 4,654,866 | 3/1987 | Böttle et al. | 379/54 |
| 4,866,763 | 9/1989 | Cooper et al. | 379/221 |
| 5,027,426 | 6/1991 | Chiocca, Jr. | 455/5 |
| 5,124,980 | 6/1992 | Maki | 370/77 |
| 5,253,288 | 10/1993 | Frey et al. | 379/221 |
| 5,278,889 | 1/1994 | Papanicolaou et al. | 379/53 |
| 5,311,585 | 5/1994 | Armstrong et al. | 379/221 |
| 5,329,308 | 7/1994 | Binns et al. | 348/14 |
| 5,341,415 | 8/1994 | Baran | 379/201 |
| 5,404,350 | 4/1995 | DeVito et al. | 379/221 |
| 5,452,351 | 9/1995 | Yamamoto | 379/221 |

*Primary Examiner*—Krista M. Zele
*Assistant Examiner*—Scott Wolinsky
*Attorney, Agent, or Firm*—Christensen, O'Connor, Johnson & Kindness

[57] ABSTRACT

An electronic switch (29) for automatically connecting a subscriber telephone instrument (31a, 31b, 31c, or 31d) to either of two telephone signal paths (27 or 28) is disclosed. Outbound calls are selectively routed to one or the other of the two telephone signal paths, based on the nature of the initial digits generated by the subscriber. Local calls are sent to a local exchange carrier (23a) and toll calls are sent to an inter-exchange carrier (25) via a transmission medium that may also carry other signals, such as cable television or utility energy management signals. In the event the normal path is out of service, outbound signals are sent via the other path. Inbound signals from either path are automatically routed to the subscriber. Signal routing is completely transparent to the subscriber.

29 Claims, 12 Drawing Sheets

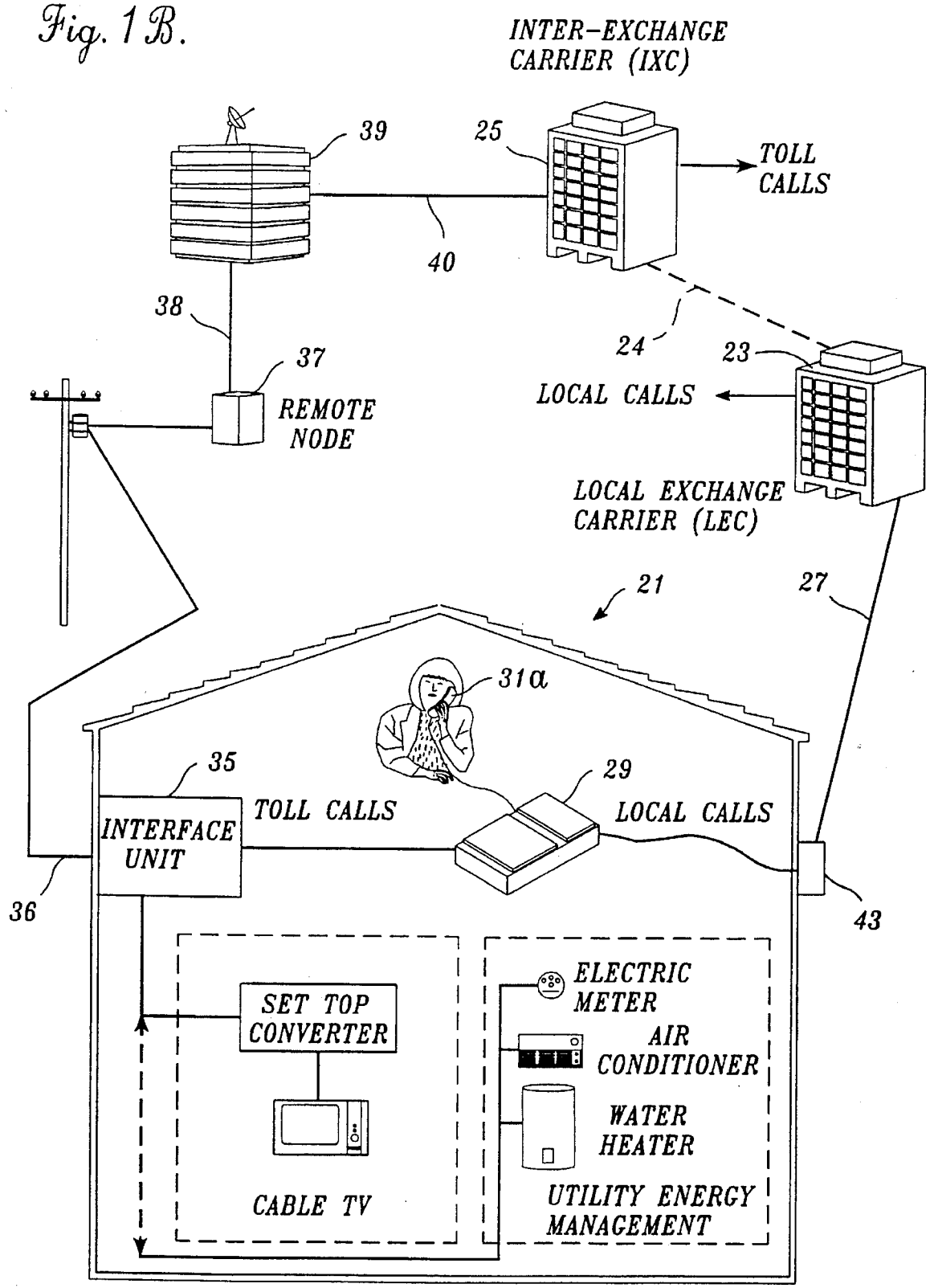

SUBSCRIBER TELEPHONE DIVERTER SWITCH

TECHNICAL AREA

This invention relates to telephone systems and, more particularly, to telephone diverter switches.

BACKGROUND OF THE INVENTION

At present, telephone communication with residential and other telephone subscribers is normally via a telephone line to a local office operated by a service provider, commonly called a local exchange carrier (LEC). The telephone line is usually terminated at the subscriber's location in the form of a pair of wires (called the tip and ring wires). All telephone calls (local and long distance) originated by the subscriber are received by the local central office via this connection. For local calls and long distance (toll) calls within the serving LATA (Local Access and Transport Area), the LEC connects the call to the called party via switching facilities within its serving area. For long distance calls outside the LATA, the LEC is currently required to deliver the call to a long distance carrier, commonly called an inter-exchange carrier (IXC). The IXC routes the call through its switching network to a LEC serving the area where the called party is located. The serving LEC makes the terminating connection to the called party via its local central office.

In addition to tip and ring wires, many subscriber residences and other telephone locations are now served or in the future will be served by other communication systems capable of carrying telephone signals, such as alternate (e.g., toll) telephone signal carriers and wired and wireless cable systems. Alternate telephone signal carrier systems include wired and wireless connections to a central office that is dedicated to carrying local or long distance toll calls.

Some cable systems carry entertainment signals to a residence or other location, and others carry utility information signals away from a residence or other location. Cable systems normally include a home interface unit located at the residence that couples a coaxial cable to pairs of wires that are connected to signal receivers or transmitters located within the residence, such as video tape recorders, television sets, electric and gas meters, etc. The coaxial and other (e.g., optical fiber) cables utilized by cable systems have the capability of simultaneously, bidirectionally carrying a variety of different signals without interference. In most instances, the full capacity of the coaxial and other cables used by cable systems is not utilized by residential telephone subscribers. Significant capability remains available. Proposals have been made to use this additional capacity to carry telephone signals.

Proposals to use alternate telephone signal carrier systems and cable systems have involved the use of a manually operated switching system that allows a subscriber to switch between the normal (local exchange) telephone tip and ring wires and the alternate signal path. Unfortunately, manually operable switches are undesirable. First, they require the subscriber to decide which system to utilize when a telephone call is to be made. Second, such switches require the intervention of the subscriber when an incoming call is received in order to connect the subscriber's telephone instrument to the appropriate signal path. Thus, a need exists for a subscriber telephone diverter switch that connects a subscriber telephone instrument to either of two telephone signal paths, both in an outbound and inbound manner that is entirely transparent to the subscriber and requires no action on the subscriber's part other than using the subscriber's telephone instrument in the normal manner. The present invention is directed to fulfilling this need.

SUMMARY OF THE INVENTION

In accordance with this invention, an electronic switch for automatically, transparently connecting a subscriber telephone instrument to either of two telephone signal paths based on the source of a telephone call is provided. The telephone instrument may be a conventional telephone, answering machine, fax machine, etc. Outbound calls are selectively routed to one or the other of the two telephone paths based on the nature of the initial digits generated by the telephone instrument. In one version of the invention, local calls are sent to a local exchange carrier (LEC) and toll calls are sent to an alternate carrier. The alternate carrier may be an alternate telephone signal carrier that only handles telephone signals or an alternate carrier, such as a cable carrier, whose transmission medium also carries other signals, such as television or utility energy management signals. In the event the normal path is out of service, outbound signals are sent via the other path. Inbound signals from either path are automatically routed to the subscriber telephone instrument. Signal routing is completely transparent to the subscriber telephone instrument. The electronic switch may be a stand-alone switch or incorporated in other equipment, such as the home interface unit of a cable system.

In accordance with other aspects of this invention, the electronic switch includes a programmed microcontroller and interface circuitry for interfacing the microcontroller to the subscriber telephone instrument and the two telephone paths.

In accordance with further aspects of this invention, the interface circuitry includes a battery feed circuit and a switching circuit. The switching circuit selectively connects the subscriber telephone signaling instrument to the battery feed circuit, or one of the two telephone paths. The battery feed circuit monitors the state of the subscriber telephone instrument and advises the programmed microcontroller when the subscriber telephone instrument goes off-hook. The battery feed circuit also forwards digit information produced by the subscriber telephone instrument to the programmed microcontroller.

In accordance with still other aspects of this invention, the interface circuitry also includes loop hold circuits for completing the loop between the tip and ring wires of the two telephone paths to hold the loop during periods of time the subscriber telephone instrument is not connected to the tip and ring wires. The loop hold circuits are enabled by loop hold signals selectively produced by the programmed microprocessor when the subscriber telephone instrument goes off-hook.

In accordance with still further aspects of this invention, the switching circuit selectively couples one of the loop hold circuits to the appropriate telephone path when the subscriber telephone instrument goes off-hook.

In accordance with yet still other aspects of this invention, the interface circuitry also includes ring detectors, a dial tone detector, a call progress tone generator, and a dual tone multifrequency (DTMF) receiver/transmitter. The ring detectors are connected to sense the ringing on the telephone paths; the call progress tone generator is coupled to the subscriber telephone instrument via the battery feed circuit to provide call waiting and other tones to the subscriber telephone instrument; the dial tone detector detects dial tone; and the DTMF receiver/transmitter receives and transmits DTMF signals as required to control the operation of the electronic switch.

In accordance with yet still further aspects of this invention, a call waiting signal is provided to the subscriber telephone instrument if a call is received over the unused telephone path when the subscriber telephone instrument is communicating via one of the two telephone paths.

In accordance with yet still other further aspects of this invention, the subscriber telephone instrument is automatically connected to the telephone path that extends to the LEC in the event of a power loss by the electronic switch.

As will be readily appreciated from the foregoing description, the invention provides an electronic switch that is ideally suited for transparently controlling the connection of a subscriber telephone instrument to one of two telephone paths. One of the telephone paths is the conventional tip and ring telephone line used to connect a subscriber residence or other location to a local central office. The other telephone path is an alternate path that may be formed by the cable or transmission medium that now or in the future will be coupled to many subscriber residences to carry other information or data signals to and/or from subscriber residences and other locations. In the event of a power failure, the subscriber telephone instrument is automatically connected to the local central office.

BRIEF DESCRIPTION OF THE DRAWINGS

The foregoing and other features and advantages of this invention will become more readily appreciated as the same becomes better understood by reference to the following detailed description, when taken in conjunction with the accompanying drawings, wherein:

FIG. 1B is a pictorial view of an alternate type of telephone communication system incorporating an electronic switch formed in accordance with this invention;

DETAILED DESCRIPTION OF THE PREFERRED EMBODIMENT

Figure 1A:
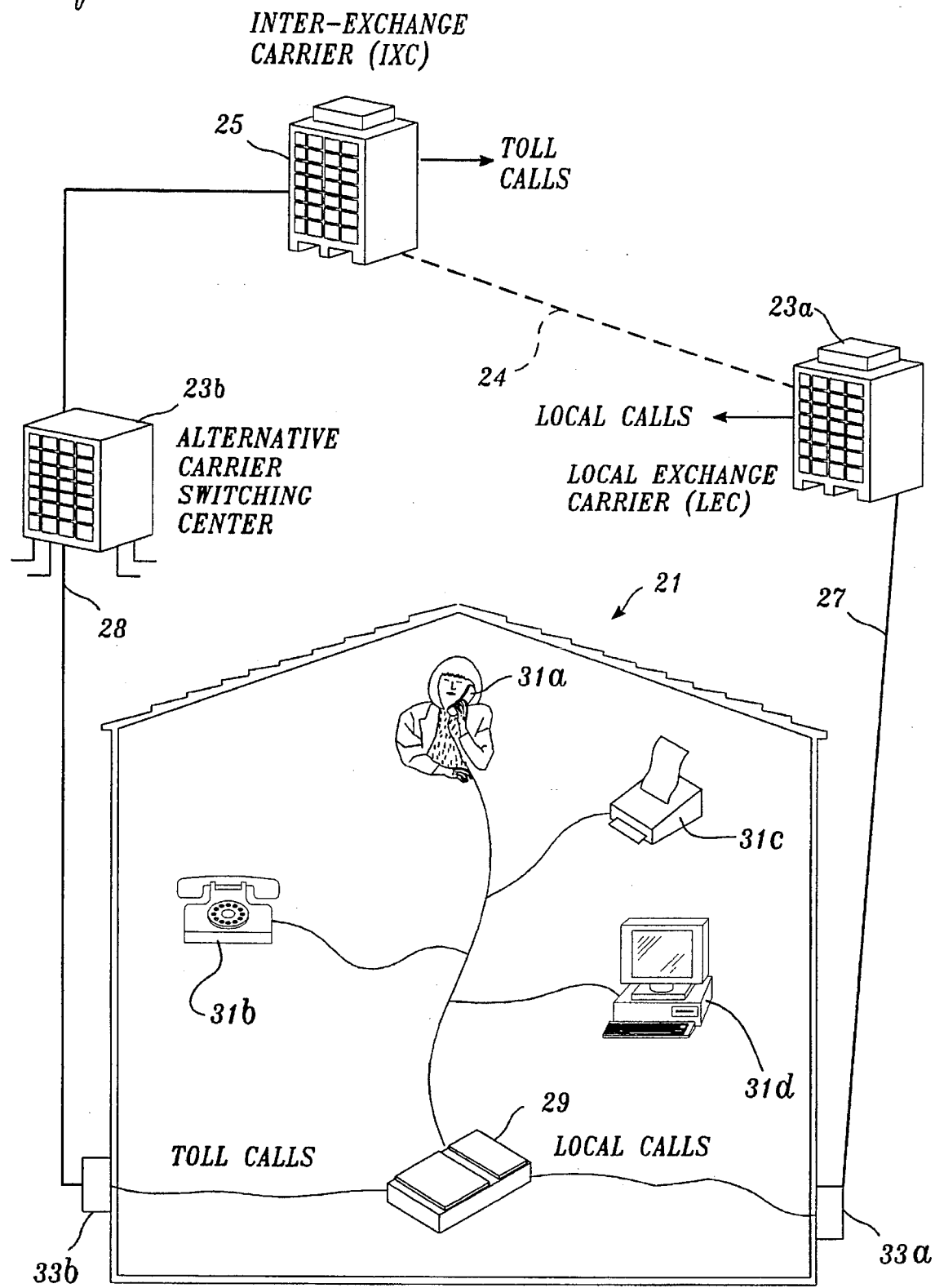
FIG. 1A is a pictorial view of one type of telephone communication system incorporating an electronic switch formed in accordance with this invention.

FIGS. 1A and 1B illustrate telephone systems incorporating an electronic switch formed in accordance with the invention. FIG. 1A illustrates a residence 21 connected to both a local exchange carrier (LEC) central office 23a and to an alternative carrier switching center 23b which is connected to an inter-exchange carrier (IXC) switching office 25. The residence 21 is connected to the LEC central office via a conventional telephone line 27 that includes tip (T) and ring (R) wires. This is the primary route. A secondary route is from the IXC switching office 25 to the LEC central office 23a and is shown by a dashed line 24.

The residence 21 is connected to the IXC switching office 25 via both a primary route and a secondary route. The primary route is through the alternative carrier switching center via an alternative transmission medium 28, which would comprise conventional tip and ring or other types of conductive wires. Alternatively, the transmission medium could be wireless. The secondary route is from the LEC central office 23a to the IXC switching office 25 and is shown by the dashed line 24 in FIG. 1A. The secondary route shown by the dashed line 24 may include additional central offices, wired connections and wireless connections (microwave tower or satellite), all of which are well known in the telecommunication art and do not form part of the present invention.

Located in the residence 21 is an electronic switch 29 formed in accordance with the invention. The electronic switch 29 connects one or more subscriber telephone instruments such as a telephone 31a/31b, fax machine 31c, computer modem 31d, or the like, by tip and ring wire pairs to either one or the other of two telco demarcation boxes 33a or 33b. The telco demarcation boxes are located at the residence ends of the telephone line 27 that connects the residence 21 to the LEC central office 23a and to the residence end of the medium 28 that connects the residence 21 to the alternative carrier switching center 23b and hence to the IXC switching office 25. As will be better understood from the following description, the electronic switch 29 is transparent to calls made from or received by the subscriber telephone instrument. As will also be understood from the following description, the electronic switch routes calls made from the subscriber telephone instrument to either of the illustrated telephone paths based on some predetermined criteria. For example, local calls may be sent to the LEC central office 23a and toll calls sent to the IXC switching office 25.

FIG. 1B illustrates an alternative arrangement. In FIG. 1B, the primary route to the IXC switching office 25 is provided by a cable connection to a cable carrier. Alternatively, the alternate signal path may be wireless. More specifically, the residence 21 is depicted as including a conventional home interface unit 35 that couples one end of the alternate signal path, shown as a coaxial cable 36, to a cable TV system and/or a utility energy management system. The cable TV system may include a set top converter for converting cable TV signals into signals suitable for display on a TV set or recording by a video tape recorder. The utility energy management system includes one or more sensors associated with an electric meter, an air conditioner, a water heater, etc. Signals produced by the sensor(s) are converted by the home interface unit into signals suitable for transmission via the coaxial cable 36. The coaxial cable 36 extends from the interface unit to a remote node 37 where the signals are converted into signals suitable for transmission via a coaxial or optical fiber cable 38 to a cable TV station or a utility control center 39. The cable TV station or utility control center 39 is connected to the IXC switching office 25 by a coaxial or optical fiber cable 40. Obviously any of the cable signal paths could be replaced with a wireless (e.g., microwave) signal path. While only a single subscriber telephone 31a is shown in FIG. 1B, as in FIG. 1A, the residence 21 shown in FIG. 1B could also include a fax machine, computer modem, additional telephones, etc. As with FIG. 1A, the residence 21 shown in FIG. 1B includes an electronic switch 29 formed in accordance with this invention for connecting the subscriber telephone instrument(s) to one or the other of two signal paths. One signal path is formed by a pair of tip and ring wire pairs that extend to the home interface unit 36. The other signal path is formed by a pair of tip and ring wires that extend to the telco demarcation box 33a located at the residence end of the telephone line 27 that connects the residence 21 to the LEC central office 23a.

As will be better understood from the following description, when a subscriber makes an outbound telephone call, the electronic switch 29 decides whether to connect the subscriber telephone instrument 31a, 31b, 31c, . . . to the telephone line 27 that connects the residence 21 to the local exchange carrier central office 23a, or to the alternate path that extends to the IXC switching office 25. Local calls are sent to the LEC central office 23a in a conventional manner. Toll calls are sent via the alternate path—the alternative transmission medium in the case of FIG. 1A or the home interface unit, the cable path in the case of FIG. 1B—to the IXC switching office 25. That is, normally long distance calls are transmitted via this route. Alternatively, in the event that the alternative path is unavailable, toll calls are sent to the LEC central office 23a for transmission to the IXC switching office 25 via the secondary route 24. Still further, in the event that the connection to the LEC central office is unavailable, local calls can be sent via the alternate path through the IXC switching office back to the LEC central office 23a.

While the primary long distance path illustrated in FIG. 1B is a coaxial cable 36, as briefly noted above, the primary long distance path could take other forms, including conductive wires, optical fiber, or wireless forms. Likewise, the LEC central office 23a could be accessed via other transmission mediums, including a wireless transmission medium.

Figure 2:
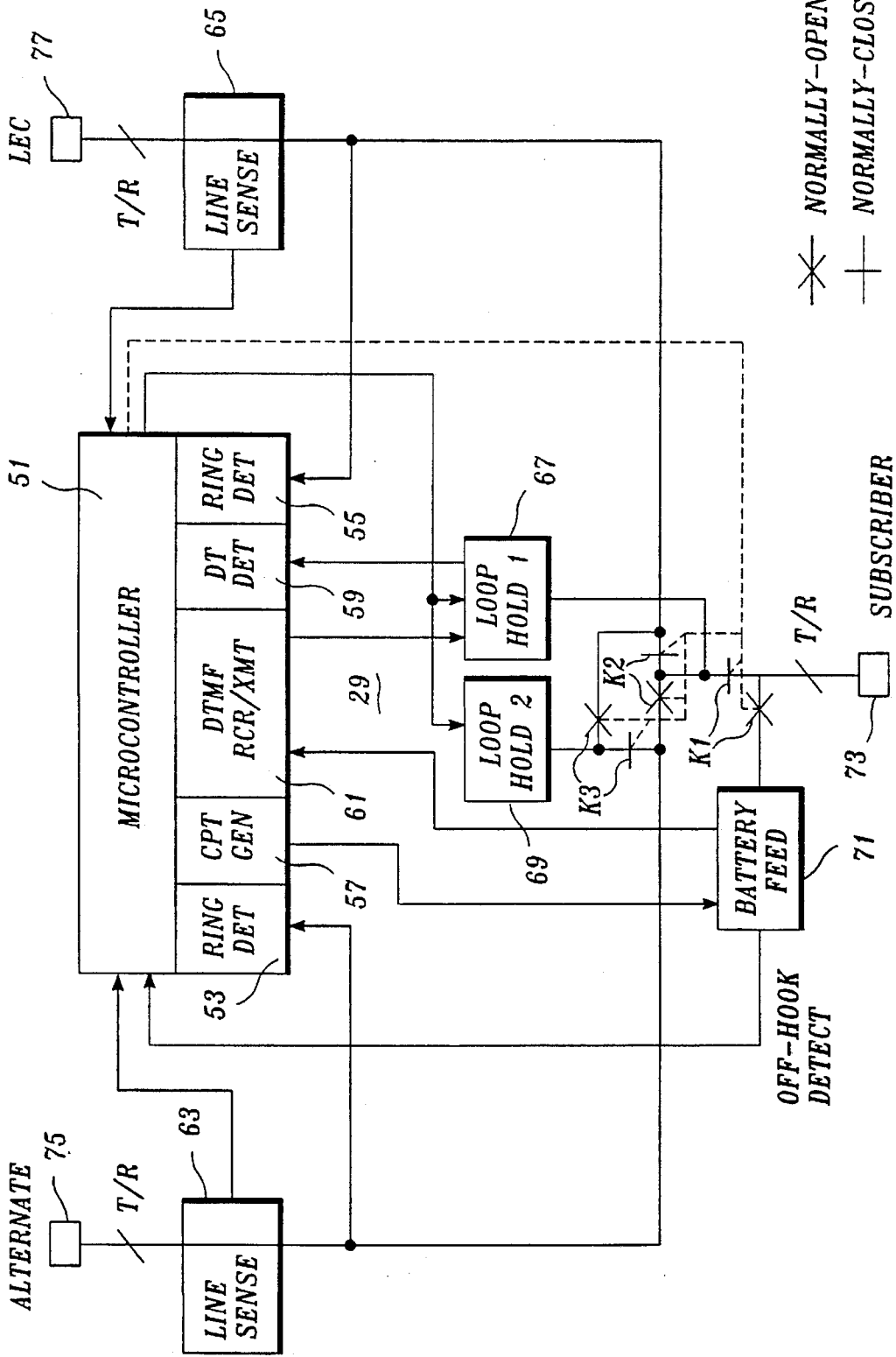
FIG. 2 is a block diagram of an electronic switch formed in accordance with this invention suitable for use in the system illustrated in FIG. 1.

FIG. 2 is a block diagram of an electronic switch 29 formed in accordance with the invention and suitable for use in the telecommunications system illustrated in FIGS. 1A and 1B. The electronic switch illustrated in FIG. 2 includes a microcontroller 51 interfaced to first and second ring detectors 53 and 55, a call progress tone generator 57, a dial tone detector 59, and a dual tone multifrequency (DTMF) receiver/transmitter (RCR/XMT) 61. The electronic switch illustrated in FIG. 2 also includes first and second line sense circuits 63 and 65; first and second loop hold circuits 67 and 69; a battery feed circuit 71; and a switching circuit that includes three sets of switch contacts designated K1, K2 and K3. K1, K2 and K3 each include normally closed contacts and normally open contacts. The electronic switch illustrated in FIG. 2 also includes three ports 73, 75 and 77. One of the ports 73, the subscriber port, is for connection to the subscriber telephone instrument 41. Another of the ports 75, the alternate port, is for connection to the alternate demarcation box 33b or to the interface unit 35; and the third port 77, the LEC port, is for connection to the LEC demarcation box 33a. While the ports can take various forms, preferably, they are standard RJ-11 telephone connectors and the connections to the subscriber telephone instrument 31a, 31b, 31c . . . , the interface unit 35, and the demarcation boxes 33a and 33b are via tip and ring wire pairs.

The battery feed circuit 71 is a coupling circuit that connects the subscriber port 73 to the microcontroller 51, the call progress tone generator 57, and the input of the DTMF RCR/XMT. More specifically, the subscriber port 73 is connected through the normally open contacts of K1 to the battery feed circuit 71. The battery feed circuit includes an off-hook detection circuit that supplies an off-hook signal to the microcontroller 51 when the subscriber telephone instrument 41 goes off-hook. The battery feed circuit also sends digit signals produced by the subscriber telephone instrument to the DTMF RCR/XMT 61. If the subscriber telephone instrument produces DTMF signals, they are sent to the DTMF RCR/XMT. If the subscriber telephone instrument produces rotary dial signals, the battery feed circuit includes a rotary dial to DTMF converter that converts the rotary pulses into DTMF signals before they are sent to the DTMF RCR/XMT. The battery feed circuit also receives call progress tones generated by the call progress tone generator 57 and forwards them to the subscriber telephone instrument connected to the subscriber port 73.

The subscriber port 73 is also connected through the normally closed contacts of K1 to one side of both the normally closed and the normally open contacts of K2. The other side of the normally open contacts of K2 is connected to the alternate port 75. The other side of the normally closed contacts of K2 is connected to the LEC port 77.

The first and second line sense circuits 63 and 65 are connected to sense the presence or absence of signals on the alternate and LEC ports 75 and 77, respectively. The first and second line sense circuits provide sense signals that denote the presence or absence of signals on their related port to the microcontroller 51.

The microcontroller produces an enable signal that is applied to the enable inputs of the first and second loop hold circuit 67 and 69. The output of the DTMF RCR/XMT is applied to a second input of the first loop hold circuit 67. The first loop hold circuit 67 includes a dial tone output that is connected to the input of the dial tone detector 59. The first loop hold circuit 67 is also connected to the side of the normally closed contacts of K1 remote from the subscriber port 73.

The second loop hold circuit 69 is connected through the normally closed contacts of K3 to the alternate port 75, and through the normally open contacts of K3 to the LEC port 77. Finally, the alternate port is connected to the first ring detector 53 and the LEC port 77 is connected to the second ring detector 55.

As will be appreciated from the foregoing description, the electronic switch illustrated in FIG. 2 is shown in schematic form. Since ring detectors, call progress tone detectors, dial tone detectors, and DTMF RCR/XMTs are well known in the telecommunications art, these circuits are not illustrated and described here. Likewise, loop hold circuits designed to function in the manner illustrated in FIG. 2, as well as battery feed circuits, are also well known in the telecommunications art and, thus, are not described. While the K1, K2 and K3 contacts are shown as relay-type contacts, obviously, the contacts could be formed by suitably controlled solid-state switches, as well as relay contacts. For ease of illustration and in order to avoid unduly complicating FIG. 2, the connections between the microprocessor and the switches represented by the K1, K2 and K3 contacts are shown as a single dashed line 79 rather than plurality of separate lines.

The microcontroller 51 receives signals from the various inputs and, in accordance therewith, controls the various circuits shown in functional block form in FIG. 2 in accordance with a program stored in the microcontroller that is illustrated in FIGS. 3–11 and described below. In essence, the microcontroller controls the various circuits to which it is connected such that outbound calls are selectively routed to one or the other of the two telephone line ports, namely, the alternate or the LEC ports, based on the nature of the initial digits generated by the subscriber's telephone instrument, e.g., the residence phone, fax, modem, etc. Normally, local calls are sent to the LEC central office via the LEC port 77, and toll calls are sent to the IXC central office via the alternate port 75. In the event the normal path is out of service, outbound signals are sent via the other path. Inbound signals from either path are automatically routed to the subscriber. Signal routing in both outbound and inbound directions is completely transparent to the subscriber. In the case of a power failure, the subscriber port 73 is automatically connected to the LEC port 77 and, thus, the local central office via the normally closed contacts of K1 and the normally closed contacts of K2.

Figure 3:
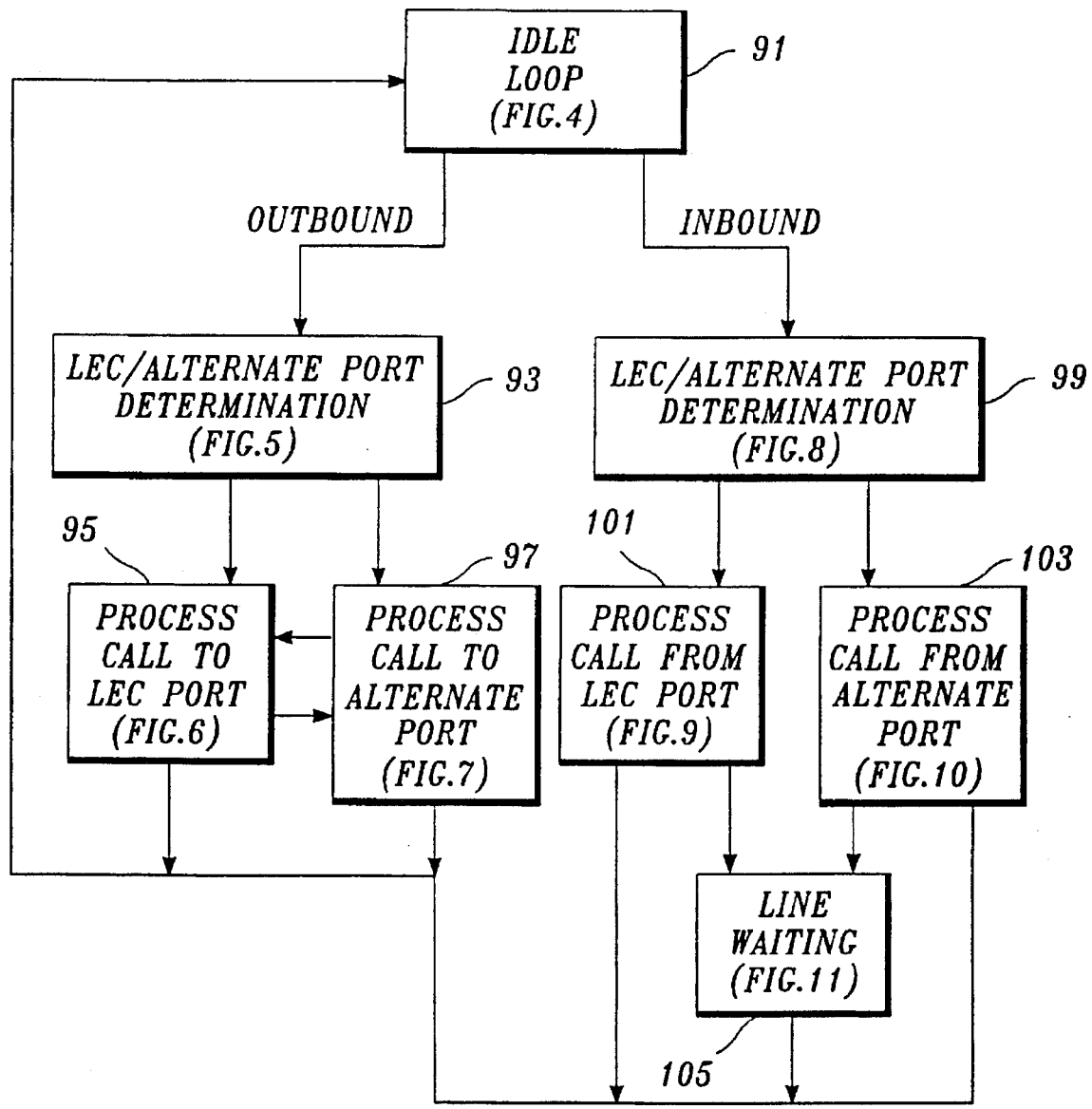
FIG. 3 is a block diagram of the program that controls the microprocessor of the electronic switch illustrated in FIG. 2.
Figure 4:
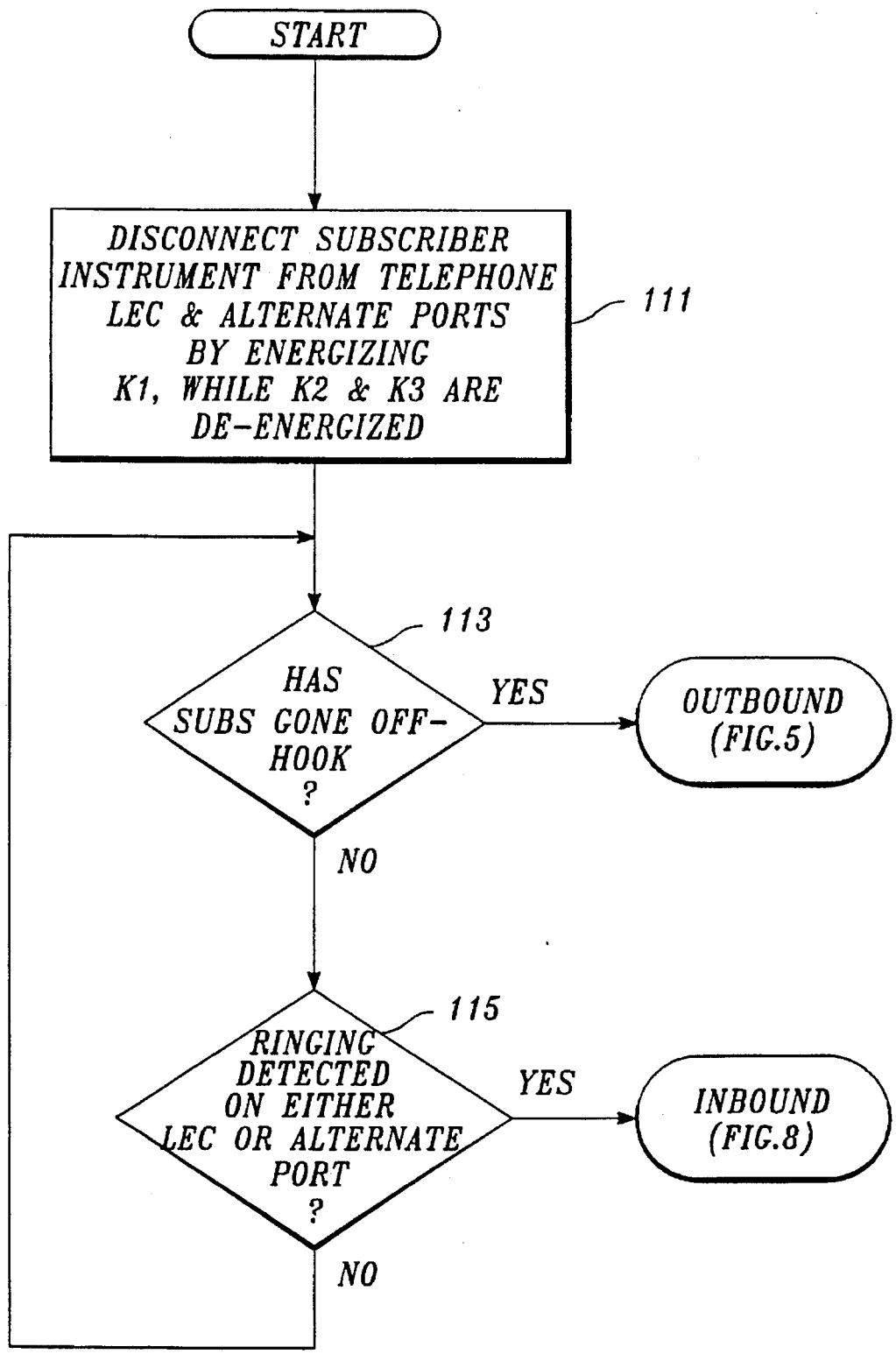
FIG. 4 is a flow diagram of idle loop suitable for use in the program illustrated in FIG. 3.
Figure 5:
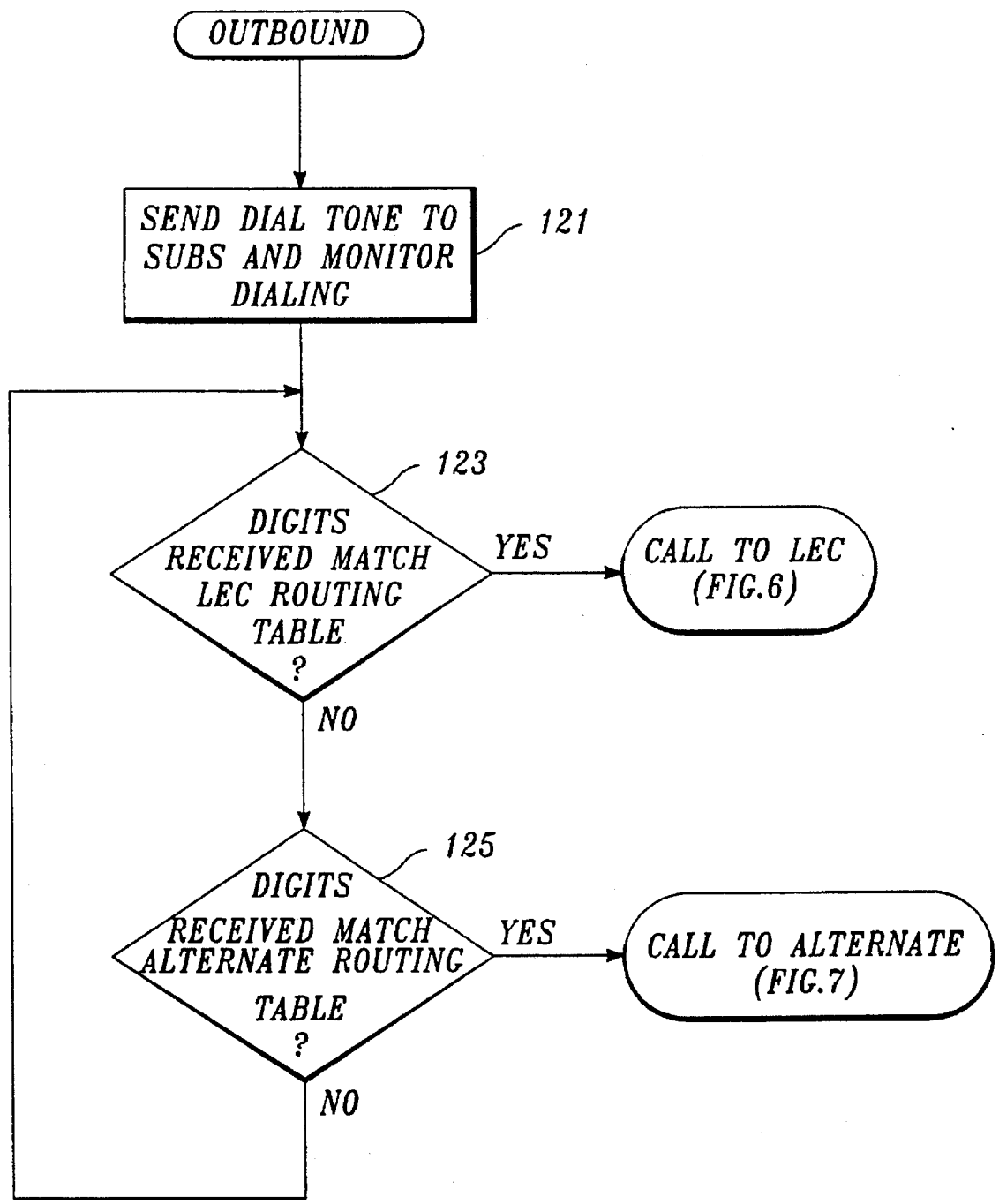
FIG. 5 is a flow diagram of an outbound LEC/alternate port determination subroutine suitable for use in the program illustrated in FIG. 3.

As illustrated in FIG. 3, the program includes an idle loop 91 in which the program rests in the absence of an inbound or outbound call. The idle loop is illustrated in FIG. 4 and described below. When the subscriber telephone instrument seizes the telephone line by going off-hook to place an outbound signal, the program shifts to an LEC/alternate port determination subroutine 93, which is illustrated in FIG. 5 and described below. The LEC/alternate port determination subroutine 93 determines whether the outbound call is a local call or a long distance call, based on the initial digits generated by the subscriber telephone instrument. As noted above, local calls are normally sent to the LEC central office 23 and toll calls are normally sent to the IXC central office 25. If the call is a local call, the program cycles to a process call to LEC port subroutine 95 illustrated in FIG. 6 and described below. If the call is a toll call, the program cycles to a process call to alternate port subroutine 97 illustrated in FIG. 7 and described below. After the call is complete, the program returns to the idle loop 91.

When an inbound call occurs, the program cycles to an inbound LEC/alternate port determination subroutine 99. If the inbound call is a local call, i.e., a call from the LEC central office 23, the program cycles to a process call from LEC port subroutine 101, illustrated in FIG. 9 and described below. If the call is from the IXC central office 25, the program cycles to a process call from alternate port subroutine 103 illustrated in FIG. 10 and described below. If the subscriber telephone signaling instrument is busy when an inbound call is received, the program cycles from the process call from LEC port subroutine 101 or the process call from alternate port subroutine 103 to a line waiting subroutine 105 illustrated in FIG. 11 and described below. After the inbound call is completed or the subscriber telephone instrument is free, the program returns to the idle loop 91.

As will be readily appreciated from the foregoing description of the microprocessor program, in essence, the microprocessor idles until an outbound call is to be made or an inbound call is received. In the case of outbound calls, a determination is made as to whether the call is local or toll. If local, the call is sent to the LEC central office 23 via the telephone line 27. If the call is a toll call, the call is sent to the IXC central office 25 via the alternate path, illustrated in FIGS. 1A and 1B and described above. If either of the "normal" paths is unavailable because of, for example, line or equipment failure, the call proceeds along the alternate route to its intended destination. In the case of inbound calls, a determination is made as to whether the inbound call is from the LEC central office 23 or the IXC central office 25. The path carrying the call controls the connection to the subscriber telephone instrument. If the subscriber telephone instrument is in use, a line waiting subroutine is entered, which advises the subscriber telephone instrument that a call is "waiting" by sending a tone to the subscriber telephone instrument at regular intervals.

As shown in block 111, the first step in the idle loop 91 illustrated in FIG. 4 is for the subscriber telephone instrument to be disconnected from the LEC and alternate ports 75 and 77 by energizing the K1 contacts. The K2 and K3 contacts are de-energized. This results in the subscriber telephone instrument being connected to the battery feed circuit 71 and disconnected from the remaining elements of the electronic switch illustrated in FIG. 2. Thereafter, a test 113 is made to determine if the subscriber telephone instrument has gone off-hook. If the subscriber telephone instrument is not off-hook, a test 115 is made to determine if ringing has been detected on either the LEC or alternate ports 75, 77. If ringing has not been detected on either the LEC or the alternate ports, the program returns to the subscriber telephone instrument off-hook test 113.

When the subscriber telephone instrument goes off-hook, the program cycles to the outbound LEC/alternate port determination subroutine 93 illustrated in FIG. 5 and described below. When ringing is detected on either the LEC or the alternate port, the program cycles to the inbound LEC/alternate port determination subroutine 99, illustrated in FIG. 8 and described below.

As shown in block 121, the first step in the outbound LEC/alternate port determination subroutine 93 (FIG. 5) is to send a dial tone to the subscriber telephone instrument and then monitor the digits dialed by the subscriber telephone instrument. Dial tone is produced by the microcontroller sending a suitable control signal to the call progress tone generator 57. In response, the call progress tone generator produces a dial tone that is supplied to the subscriber telephone instrument by the battery feed circuit and the normally open contacts of K1. As shown in FIG. 4, block 111, and as previously described, the normally open contacts of K1 are closed due to the energizing of K1. Monitoring of the digits dialed by the subscriber telephone instrument is accomplished by the DTMF RCR/XMT, as noted above.

The next step in the outbound LEC/alternate port determination subroutine 93 is a test 123 to determine if the initial digits produced by the subscriber telephone instrument match a local exchange carrier (LEC) routing table. If the initial digits match the LEC routing table, the program cycles to the process call to LEC port subroutine 95, illustrated in FIG. 6 and described below. If the initial digits do not match the LEC routing table, a test 125 is made to determine if the initial digits match an alternate routing table. If the initial digits match the alternate routing table, the program cycles to the process call to alternate port subroutine 97 illustrated in FIG. 7 and described below. If the initial digits do not match the alternate routing table, the digits received match LEC routing table test 123 is performed again.

Figure 6:
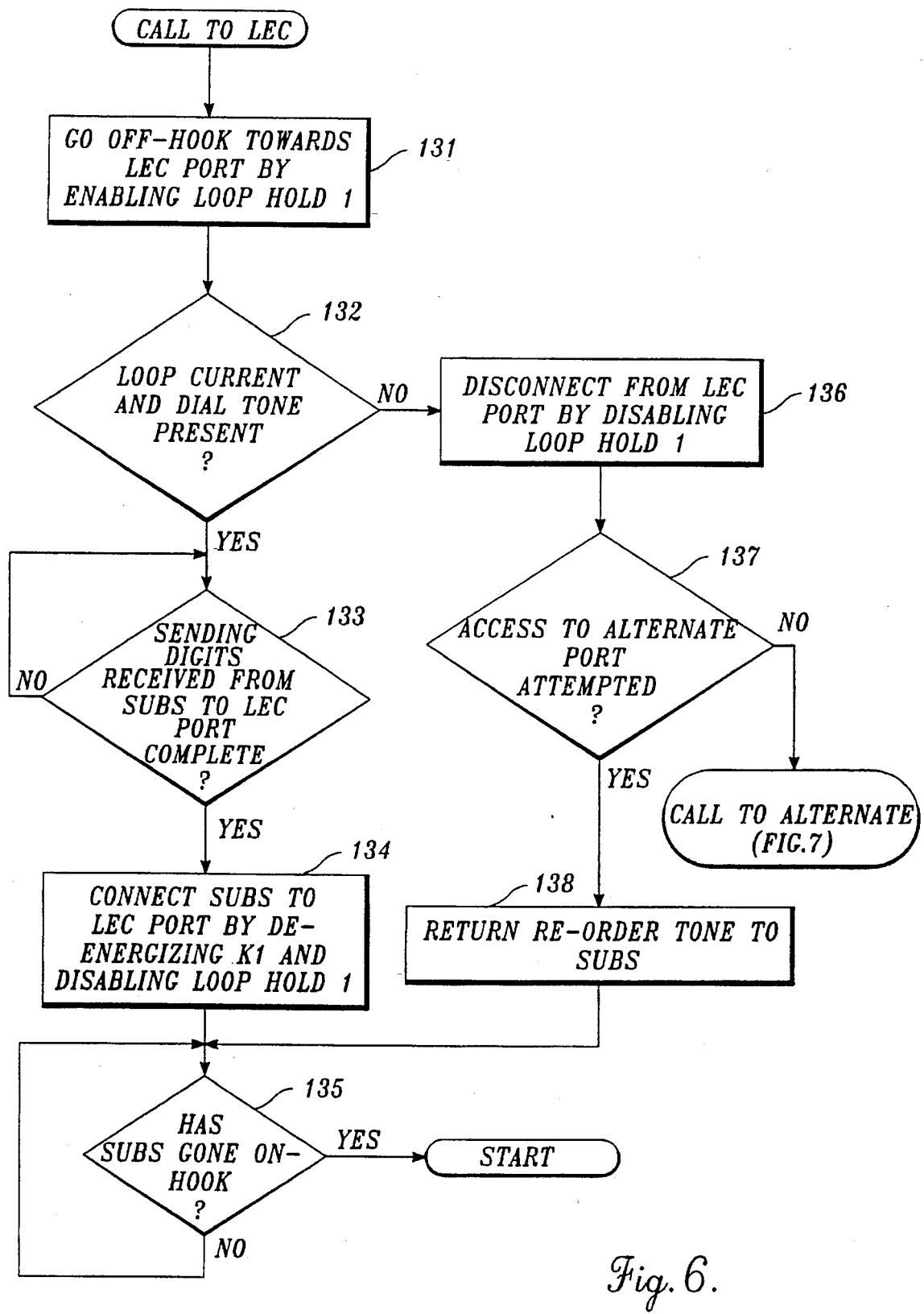
FIG. 6 is a flow diagram of a process call to LEC port subroutine suitable for use in the program illustrated in FIG. 3.

The first step 131 of the process call to LEC port subroutine illustrated in FIG. 6 is for the electronic switch to go off-hook towards the LEC port by enabling the first loop hold circuit 67. In a conventional manner, enabling the first loop hold circuit 67 completes the loop across the tip and ring telephone wires running from the LEC port 77 to the LEC central office 23a. In essence, this results in the telephone line to the LEC central office being "seized." Holding occurs via the normally closed contacts of K2. Next, a test 132 is made of the output of the second line sense circuit 65 to determine if loop current and dial tone are present. Loop current is the current that flows through the tip and ring wires extending to the LEC central office when the first loop hold circuit is enabled to seize the telephone line to the LEC control office. Dial tone is the dial tone on this telephone line.

If loop current and dial tone are present, the digits generated by the subscriber telephone instrument and received by the DTMF RCR/XMT are sent to the LEC central office via the first loop hold circuit 67. As this is occurring, a test 133 is continuously being performed to determine if all the digits received from the subscriber telephone instrument have been sent to the LEC central office.

When the transmission of the subscriber telephone instrument digits to the LEC central office is complete, the subscriber's telephone instrument is connected to the LEC central office by deenergizing K1 and disabling the first loop hold circuit 67. See block 134. When K1 is deenergized, the subscriber telephone instrument is disconnected from the battery feed circuit 71 and connected to the LEC tip and ring lines via the normally closed contacts of K1 and the normally closed contacts of K2. Thus, the line is now held by the off-hook subscriber telephone instrument. Thereafter, a test 135 of the output of the second line sense circuit 65 is made to determine if the subscriber telephone instrument has gone on-hook. The program remains in this loop until the subscriber telephone instrument goes on-hook. When this occurs, the program returns to the idle loop 91 illustrated in FIG. 3 and described above.

If loop current and dial tone are not present (test 132), the electronic switch is disconnected from the LEC central office line by disabling the first loop hold circuit 67. See block 136. Disconnection occurs because the absence of loop current and dial tone indicates that there is a break in the wiring to the LEC central office, either in the residence or in the line extending from the residence to the LEC central office 23a, or a malfunction has occurred at the LEC central office that prevents loop current from flowing. Next, a test 137 is made to determine if access to the IXC central office 25 via the alternate port 75 has been attempted. If access to the IXC central office via the alternate port 75 has not been attempted, the program cycles to the process call to alternate port subroutine 97 illustrated in FIG. 7 and described below. If access to the IXC central office via the alternate port has been attempted, a return re-order tone is sent to the subscriber telephone instrument. See block 138. The return re-order tone is produced by the call progress tone generator 57 and is supplied to the subscriber telephone instrument via the battery feed circuit 71 and the normally open contacts of K1, which are closed, because K1 is energized. The return re-order tone indicates to the subscriber telephone instrument that a connection to the LEC central office has not been completed. The return re-order tone causes the subscriber to return the telephone subscriber instrument on-hook and, if desired, re-dial the telephone call. Thereafter, the program cycles to the has subscriber gone on-hook test 135.

Figure 7:
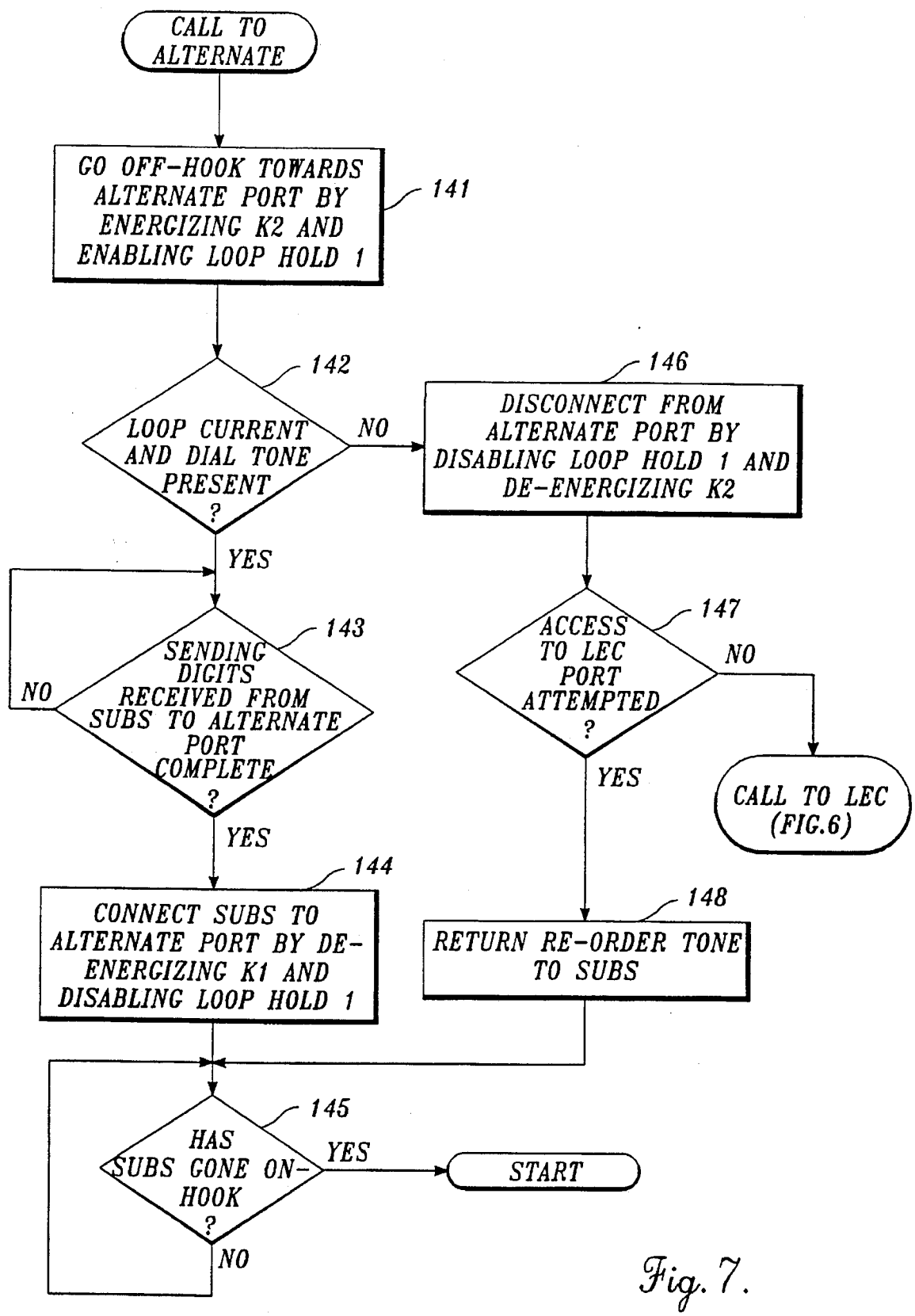
FIG. 7 is a flow diagram of a process call to cable port subroutine suitable for use in the program illustrated in FIG. 3.

The first step 141 in the process call to alternate port subroutine 97 illustrated in FIG. 7 is for the electronic switch to go off-hook towards the IXC central office via the alternate port 75 by energizing K2 and enabling the first loop hold circuit 67. As before, enabling the first loop hold circuit 67 closes the path between the tip and ring lines connected to the alternate port 75, allowing loop current to flow. Next, a test 142 of the output of the first line sense circuit 63 is made to determine if loop current and dial tone are present. If loop current and dial tone are present, the microcontroller causes the DTMF RCR/XMT to transmit the digits received from the subscriber telephone instrument to the IXC central office via first loop hold circuit 67, the alternate port, the interface unit 29, and the previously described cable network.

The program next enters an idle loop that includes a test 143 that determines when all of the digits have been sent. Thereafter, the subscriber telephone instrument is connected to the alternate port by deenergizing K1 and disabling the first loop hold circuit 67. See block 144. Deenergizing K1 results in the battery feed circuit 71 being disconnected from the subscriber port 73 and the subscriber port 73 being connected to the alternate port 75 through the normally closed contacts of K1 and the normally open contacts of K2. The normally open contacts of K2 are closed as a result of K2 being energized. The subscriber port 73 is not connected to the LEC port 77 due to the normally closed contacts of K2 being open. Thereafter, a test 145 of the output of the first line sense circuit 63 is made to determine if the subscriber telephone instrument is on-hook. As long as the subscriber telephone instrument remains off-hook, the program remains in a test loop. When the subscriber telephone instrument goes on-hook, the program cycles to the idle loop 91 illustrated in FIG. 4 and described above.

If loop current or dial tone are not present when the loop current and dial tone present test 142 is performed, the electronic switch is disconnected from the alternate port 75 by disabling the first loop hold circuit 67 and deenergizing K2. See block 146. Next, a test 147 is made to determine if access to the LEC port 77 has been attempted. If access to the LEC port has not been attempted, the program cycles to the process call to LEC port subroutine 95 illustrated in FIG. 6 and described above. If access to the LEC port has been attempted, a return re-order tone is sent to the subscriber telephone instrument and the program cycles to the has subscriber gone on-hook test 145. The return re-order tone that is returned to the subscriber telephone signaling instrument is generated by the call progress tone generator 57 in the manner previously described with respect to FIG. 6. After the subscriber telephone instrument goes on-hook, the program returns to the idle loop subroutine 41 shown in FIG. 4 and described above.

Figure 8:
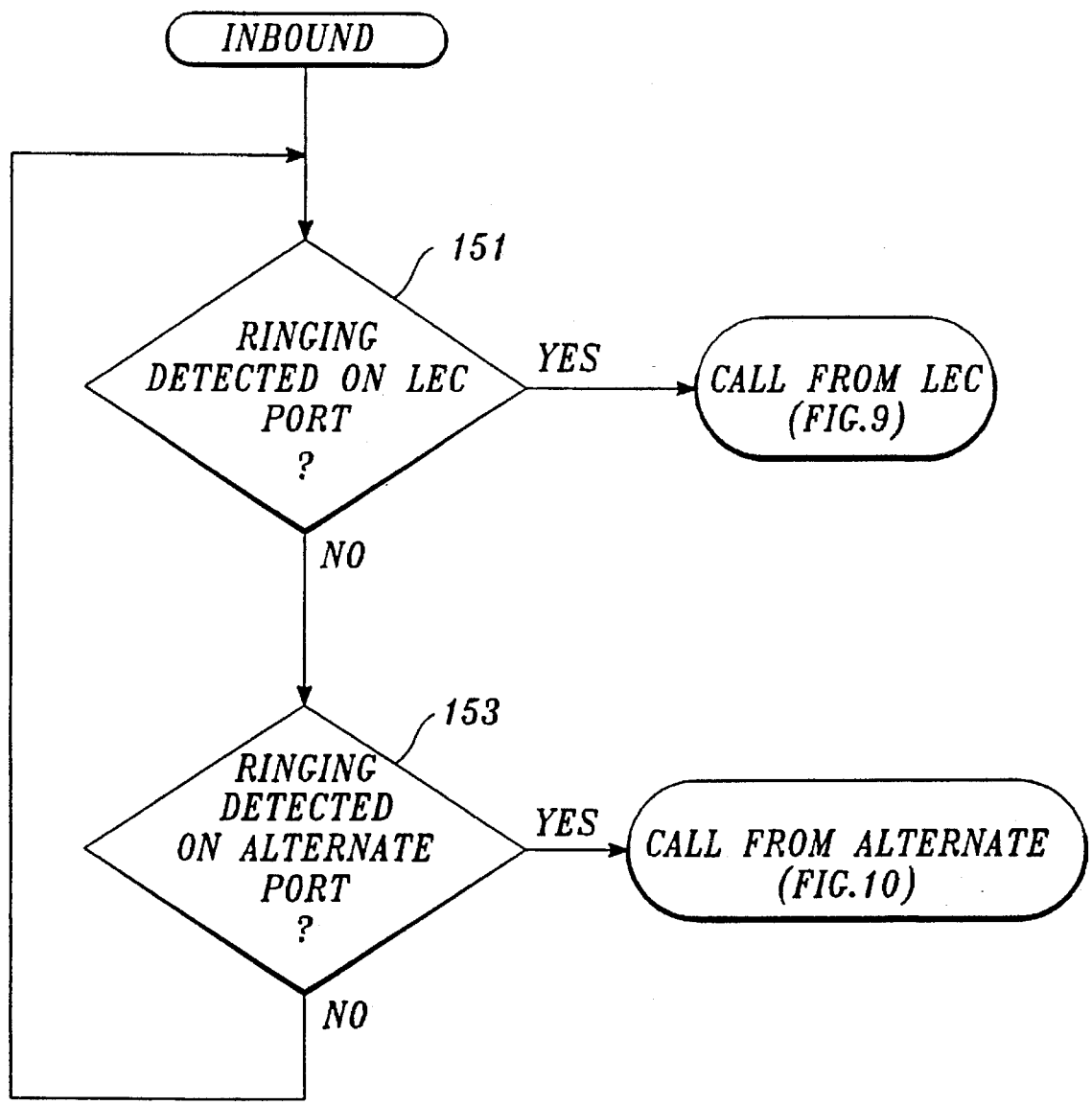
FIG. 8 is a flow diagram of an inbound LEC/alternate port determination subroutine suitable for use in the program illustrated in FIG. 3.

The first step in the in-bound LEC/alternate port determination subroutine 99 illustrated in FIG. 8 is a test 151 of the second ring detector 55 to determine if ringing has been detected on the LEC port. If ringing has not been detected on the LEC port, a test 153 of the first ring detector 53 is made to determine if ringing has been detected on the alternate port. If ringing has not been detected on the alternate port, the ringing test on the LEC port 151 is repeated. If ringing has been detected on the LEC port, the program cycles to the process call from LEC port subroutine 101 illustrated in FIG. 9 and described below. If ringing has been detected on the alternate port, the program cycles to the process call from alternate port subroutine 103 illustrated in FIG. 10 and described below.

Figure 9:
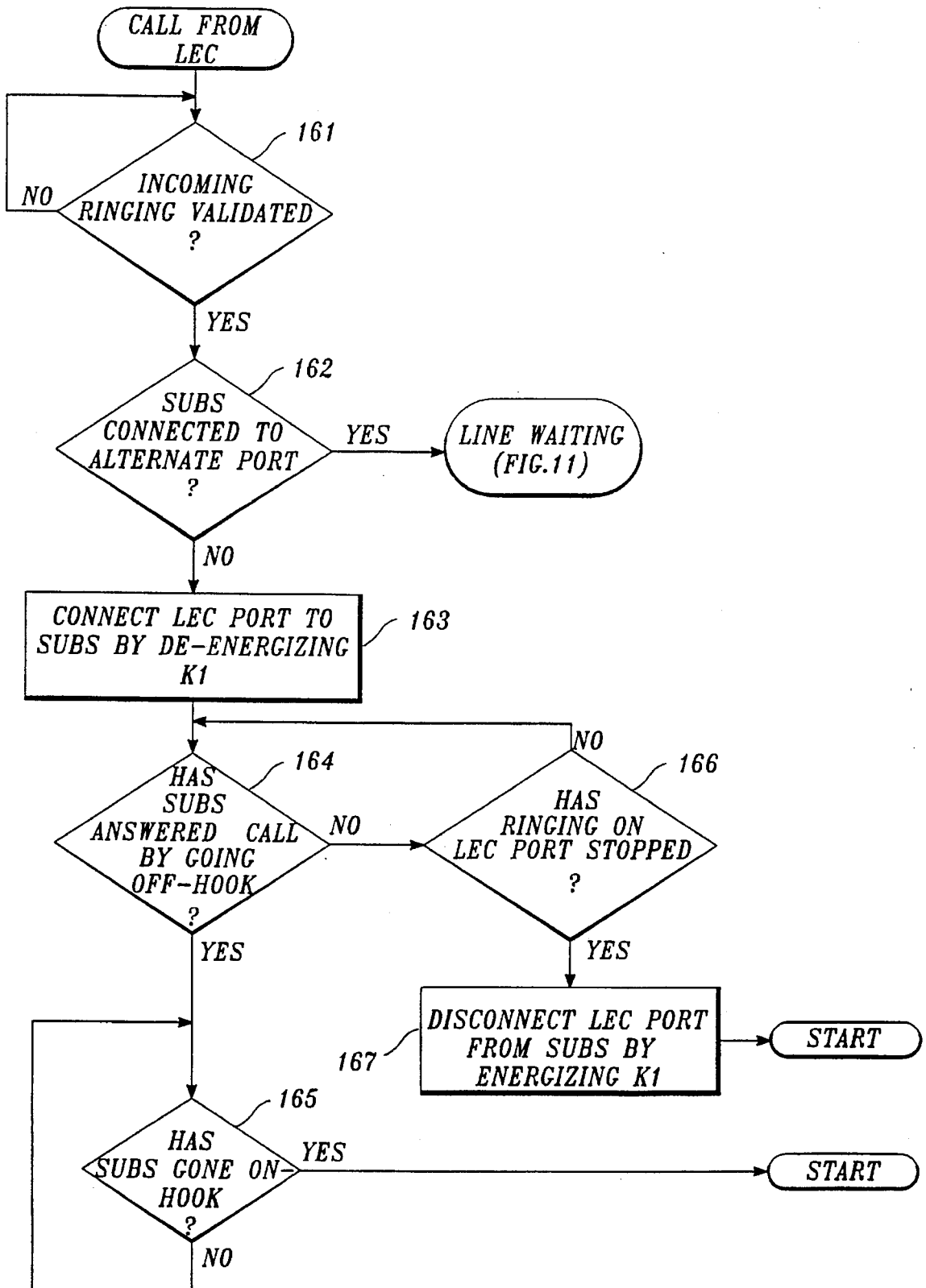
FIG. 9 is a flow diagram of a process call from LEC port subroutine suitable for use in the program illustrated in FIG. 3.
Figure 10:
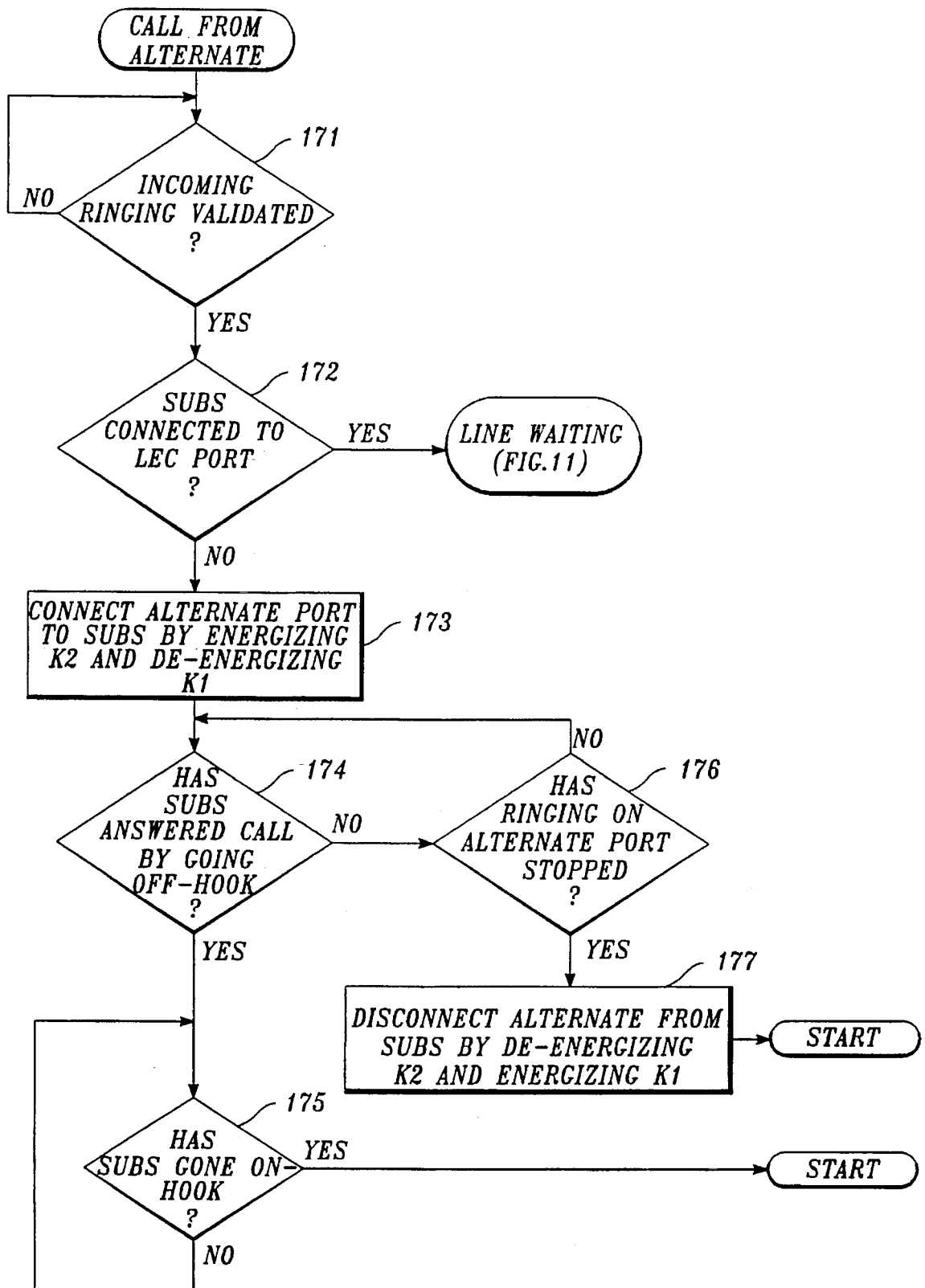
FIG. 10 is a flow diagram of a process call from cable port subroutine suitable for use in the program illustrated in FIG. 3.

The first step in the process call from LEC port subroutine 101 illustrated in FIG. 9 is a test 161 to determine if the incoming ring has been validated as a true ringing signal. This is accomplished by the second ring detecting circuit 55 evaluating the ringing signal at the LEC port 77. If the ringing signal is valid, a test 162 is made to determine if the subscriber telephone instrument is connected to the alternate network via the alternate port 75. If the subscriber telephone instrument is connected to the alternate port 75, the program cycles to the line waiting subroutine illustrated in FIG. 11 and described below. If the subscriber telephone instrument is not connected to the alternate port 75, the subscriber telephone instrument is connected to the LEC port 77 by deenergizing K1. See block 163.

Next, a test 164 is made to determine if the subscriber telephone instrument has answered the call by going off-hook. If the subscriber telephone instrument has answered the call by going off-hook, the program cycles to a loop that includes a test 165 of the output of the second line sense circuit 65 to determine if the subscriber telephone instrument has gone on-hook. The program remains in this loop until the subscriber telephone instrument goes on-hook. When this occurs, the program returns to the idle loop 91 illustrated in FIG. 4 and described above.

If the subscriber telephone instrument has not answered the call by going off-hook, a test 166 is made to determine if the ringing signal at the LEC port has stopped. If the ringing has not stopped, the has subscriber answered call by going off-hook test 164 is repeated. The program remains in this loop until either the subscriber answers the call or the ringing stops. When the ringing stops, the LEC port is disconnected from the subscriber telephone instrument by energizing K1. See block 167. Thereafter, the program cycles to the idle loop illustrated in FIG. 4 and described above.

The first step in the process call from alternate port subroutine 103 (FIG. 10) is a test 171 to determine if the incoming ringing signal has been validated. This is accomplished by the first ring detector 53 evaluating the ring signal at the alternate port 75. After the incoming ringing signal has been validated, a test 172 is made to determine if the subscriber telephone instrument is connected to the LEC port 77. If the subscriber telephone instrument is connected to the LEC port 77, the program cycles to the line waiting subroutine illustrated in FIG. 11 and described below.

If the subscriber telephone instrument is not connected to the LEC port, the alternate port 75 is connected to the subscriber by energizing K2 and deenergizing K1. Thereafter, a test 174 of the output of the first line sense circuit 63 is made to determine if the subscriber has answered the call by going off-hook. When the subscriber telephone instrument answers the call by going off-hook, the program cycles to a loop that includes a test 175 of the output of the first line sense circuit 63 that determines if the subscriber telephone instrument has gone on-hook. The program remains in this loop until the subscriber telephone instrument goes on-hook. Thereafter, the program cycles to the idle loop 91 illustrated in FIG. 4 and described above.

If the subscriber telephone instrument has not answered the call by going off-hook, a test 176 is made to determine if the ringing has stopped at the alternate port. If the ringing has not stopped, the has subscriber answered call by going off-hook test 174 is repeated. The program remains in this loop until either the subscriber answers the call or the ringing stops at the alternate port. If the ringing stops first, the alternate port is disconnected from the subscriber telephone instrument by deenergizing K2 and energizing K1. See block 177. Then, the program cycles to the idle loop 91 illustrated in FIG. 4 and described above.

Figure 11:
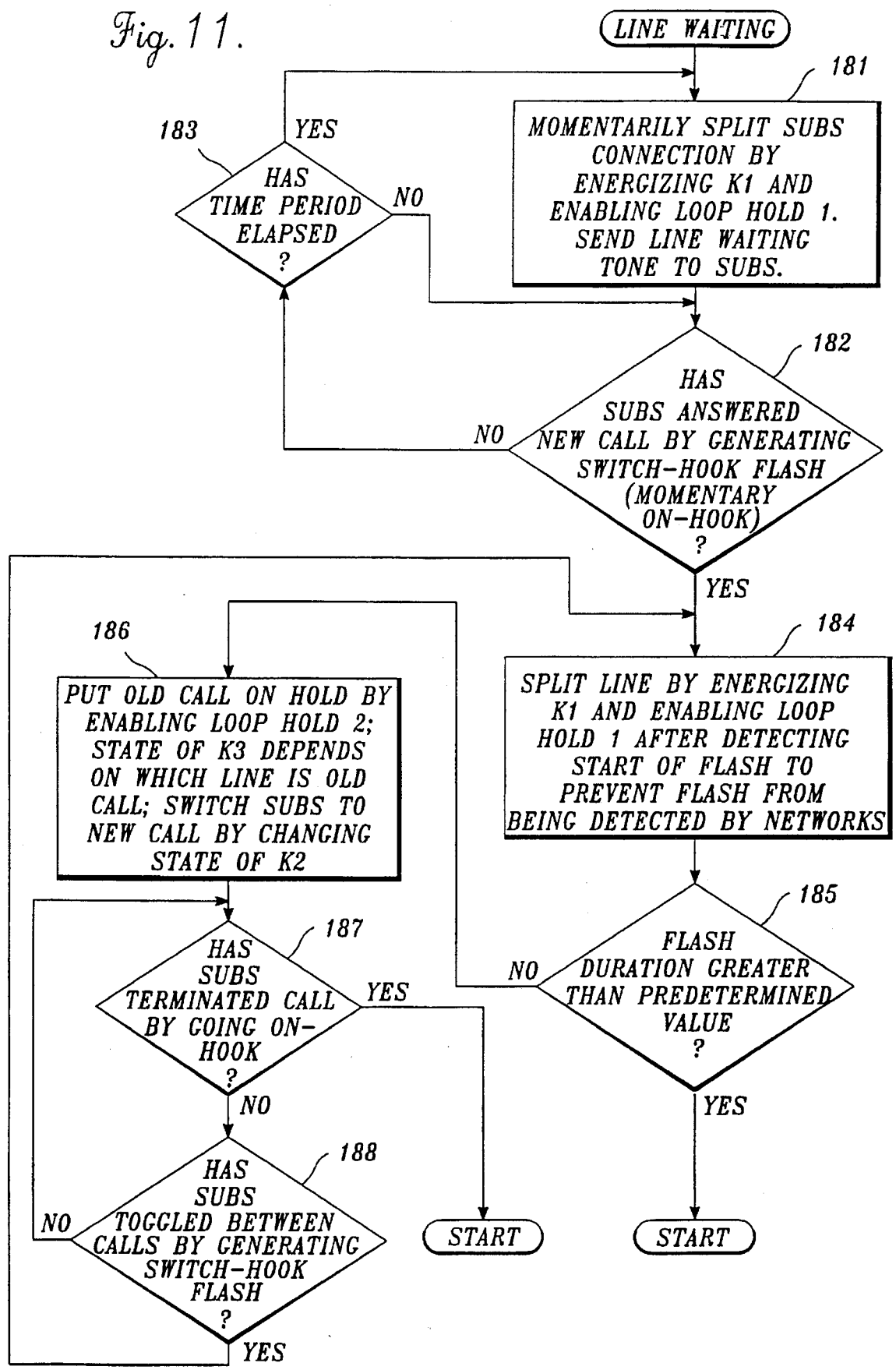
FIG. 11 is a flow diagram of a line waiting subroutine suitable for use in the program illustrated in FIG. 3.

As shown in block 181, the first step in the line waiting subroutine illustrated in FIG. 11 is a momentary split of the subscriber telephone instrument connection by energizing K1 and enabling the first loop hold circuit 67. During the momentary split, a line waiting tone is sent to the subscriber telephone instrument. The line waiting tone is generated by the call progress tone generator 57, and is transmitted via the battery feed circuit and the normally open contacts of K1, which are closed when K1 is energized. This action is repeated at a predetermined interval, such as every 10 seconds. In this regard, after the momentary splitting and transmission of the waiting tone has occurred, a test 182 is made to determine if the subscriber has answered the new call by generating a switch-hook flash, i.e., by the subscriber telephone instrument momentarily going on-hook. If the subscriber telephone instrument has not momentarily gone on-hook, a test 183 is made to determine if the predetermined time interval has elapsed. If the predetermined time interval has not elapsed, the has subscriber telephone instrument answered the new call by generating a switch-hook flash is repeated. The program remains in this loop until either the predetermined time period elapses or the subscriber telephone instrument answers the new call by generating a switch hook flash.

If the predetermined time period elapses first, the program cycles to block 181 where the line is again momentarily split and another line waiting tone is sent to the subscriber telephone instrument. When the subscriber telephone instrument answers the new call by generating a switch-hook flash, the line is split by energizing K1 and enabling the first loop hold circuit 67. This occurs a predetermined, relatively short (e.g., 100 ms) interval after the flash is detected to prevent the flash from being detected by the telephone networks connected to the alternate and LEC ports 75 and 77. See block 184.

Next, a test 185 is made to determine if the flash duration is greater than some predetermined intervals, such as 1100 ms. If the flash duration is not greater than the predetermined interval, the old call is placed on hold by enabling the second loop circuit 69, setting the state of K3 to connect the second loop hold circuit to either the alternate port 75 or the LEC port 77 depending upon which port is receiving the old call, and switching the subscriber to the new call by changing the state of K2. See block 186.

Next, a test 187 is made to determine if the subscriber telephone instrument has terminated the call by going on-hook. If the subscriber terminates the call by going on-hook, the program cycles to the idle loop 91 illustrated in FIG. 4 and described above. If the subscriber has not terminated the call by going on-hook, a test 188 is made to determine if the subscriber has toggled between calls by generating a switch-hook flash. If the subscriber has not toggled between calls by generating a switch-hook flash, the test 187 to determine if the subscriber call has been terminated by going on-hook is repeated. If the subscriber toggles between calls by generating another switch-hook flash, the program returns to block 184 where the line is split by deenergizing K1 and enabling the first loop hold circuit 67 after detecting a flash for the predetermined short interval that is designed to prevent the flash from being detected by the telephone networks connected to the alternate and LEC ports 75 and 77.

If the flash duration is greater than the predetermined interval required by the flash duration test 185, the subscriber is presumed to have terminated the call by going on-hook. In this case, the program cycles to the idle loop 91 illustrated in FIG. 4 and described above.

As will be appreciated from the foregoing description, the invention provides an electronic switch for automatically connecting a subscriber telephone instrument, such as a telephone, fax machine, modem, etc., to either of two telephone signal paths based on the source of a telephone call. Outbound calls are selectively routed to one or the other of two telephone paths based on the nature of the initial digits generated by the subscriber telephone instrument. Local calls are sent to a local exchange carrier (LEC) and toll calls are sent to an inter-exchange carrier (IXC) via a transmission medium that may also carry other signals, such as cable television or utility energy management signals. In the event the normal path is out of service, outbound signals are sent via the other path. Inbound signals from either path are automatically routed to the subscriber. In the event of a power failure, the subscriber telephone instrument is automatically connected to the local exchange carrier. Signal routing is completely transparent to the subscriber.

While a preferred embodiment of the invention has been illustrated and described, it is to be understood that various changes can be made therein without departing from the spirit and scope of the invention. For example, while a subscriber telephone diverter switch formed in accordance with the invention has been described as a stand-alone item, it is to be understood that the switch could be integrated into other items, such as a cable interface unit. Hence, within the scope of the appended claims it is to be understood that the invention can be practiced otherwise than as specifically described herein.

The embodiments of the invention in which an exclusive property or privilege is claimed are defined as follows:

1. A subscriber telephone diverter switch for connecting a subscriber telephone instrument to either of two telephone signal paths, said subscriber diverter switch comprising:
   (a) one and only one subscriber port for connection to a subscriber telephone instrument;
   (b) two and only two telephone signal paths, one of said telephone signal paths for connection to a local exchange carrier (LEC) central office and the other of said telephone signal paths for connection to an alternate carrier switching center;
   (c) interface circuitry for: (i) interfacing a programmed microcontroller with said subscriber port and said two telephone signal paths; (ii) detecting a ring signal on either of said two telephone signal paths; (iii) detecting when a subscriber telephone instrument connected to said subscriber port goes off-hook; and (iv) selectively connecting said subscriber port to either of said two telephone signal paths based on instructions received from said programmed microcontroller; and
   (d) a programmed microcontroller connected to said interface circuitry for: (i) determining when a subscriber telephone instrument connected to said subscriber port goes off-hook and causing said interface circuitry to connect said subscriber port to one of said two telephone signal paths in accordance with the initial digits dialed by said subscriber telephone instrument connected to said subscriber port; and (ii) determining when a ringing signal is present on either of said two telephone signal paths and causing said interface circuitry to connect said telephone signal path on which a ringing signal is present to said subscriber port.

2. The subscriber telephone diverter switch claimed in claim 1 wherein said interface circuitry automatically connects said subscriber port to said signal path for connection to a local exchange carrier (LEC) central office in the event of a power failure.

3. The subscriber telephone diverter switch claimed in claim 1 wherein said interface circuitry includes a switching circuit for selectively connecting said subscriber port to either of said two telephone signal paths.

4. The subscriber telephone diverter switch claimed in claim 3 wherein:
   said interface circuitry includes ring detecting means connected to said two telephone signal paths for detecting ringing signals on either of said two telephone signal paths; and
   said programmed microcontroller causes said switching circuit to connect said subscriber port to the one of said two telephone signal paths on which a ringing signal is occurring when a ringing signal is detected by said ring detecting means.

5. The subscriber telephone diverter switch claimed in claim 4 wherein:
   said interface circuitry includes a loop hold circuit;
   said switching circuit selectively connects said loop hold circuit to said two telephone signal paths; and
   said programmed microcontroller causes said switching circuit to connect said loop hold circuit to the one of said two telephone signal paths connected to said subscriber port when said ring detecting means detects a ringing signal on the other of said two telephone signal paths while said subscriber port is connected to said one of said two telephone signal paths.

6. The subscriber telephone diverter switch claimed in claim 3 wherein said switching circuit automatically connects said subscriber port to said signal path for connection to a local exchange carrier (LEC) central office in the event of a power failure.

7. The subscriber telephone diverter switch claimed in claim 3 wherein:
   said interface circuitry includes a coupling circuit suitable for detecting when a telephone instrument goes off-hook;
   said switching circuit selectively connects said coupling circuit to said subscriber port; and
   said programmed microcontroller is connected to said coupling circuit for receiving a signal denoting that a telephone instrument connected to said subscriber port has gone off-hook when said coupling circuit detects that a telephone instrument connected to said subscriber port has gone off-hook.

8. The subscriber telephone diverter switch claimed in claim 7 wherein:
   said coupling circuit also detects the digits generated by a telephone instrument connected to said subscriber port and forwards said digits to said programmed microcontroller; and
   said programmed microcontroller causes said switching circuit to connect said subscriber port to one of said two telephone signal paths in response to said digits.

9. The subscriber telephone diverter switch claimed in claim 8 wherein:
   said interface circuitry also includes a first loop hold circuit;
   said switching circuit selectively connects said first loop hold circuit to said two telephone signal paths; and
   said programmed microcontroller causes said switching circuit to connect said first loop hold circuit to said one of said two telephone paths.

10. The subscriber telephone diverter switch claimed in claim 9 wherein said programmed microcontroller determines if loop current is present when said switching circuit connects said first loop hold circuit to said one of said two telephone paths.

11. The subscriber telephone diverter switch claimed in claim 10 wherein said programmed microcontroller causes said interface circuitry to transmit the digits generated by said telephone instrument connected to said subscriber port along said one of said two telephone signal paths.

12. The subscriber telephone diverter switch claimed in claim 11 wherein said programmed microcontroller causes said switching circuit to: (i) connect said subscriber port to said coupling circuit while said interface circuitry is transmitting the digits generated by a telephone instrument connected to said subscriber port along one of said two telephone signal paths and; (ii) after all of the digits have been transmitted, connect said subscriber port to said one of said two telephone signal paths.

13. The subscriber telephone diverter switch claimed in claim 12 wherein:

said interface circuitry includes a tone generator;

said coupling circuit connects said tone generator to said subscriber port; and said programmed microcontroller causes said tone generator to generate a dial tone when a telephone instrument connected to said subscriber port goes off-hook prior to when said telephone instrument generates digits.

14. The subscriber telephone diverter switch claimed in claim 13 wherein:

said interface circuitry includes ring detecting means connected to said two telephone signal paths for detecting ringing signals on either of said two telephone signal paths; and said programmed microcontroller causes said switching circuit to connect said subscriber port to the one of said two telephone signal paths on which a ringing signal is occurring when a ringing signal is detected by said ring detecting means.

15. The subscriber telephone diverter switch claimed in claim 14 wherein:

said interface circuitry includes a second loop hold circuit;

said switching circuit selectively connects said second loop hold circuit to said two telephone signal paths; and said programmed microcontroller causes said switching circuit to connect said second loop hold circuit to the one of said two telephone signal paths connected to said subscriber port when said ring detecting means detects a ringing signal on the other of said two telephone signal paths while said subscriber port is connected to said one of said two telephone signal paths.

16. The subscriber telephone diverter switch claimed in claim 1 wherein said other of said telephone signal paths also carries unrelated non-telephone signals.

17. The subscriber telephone diverter switch claimed in claim 16 wherein said interface circuitry includes a switching circuit for selectively connecting said subscriber port to either of said two telephone signal paths.

18. The subscriber telephone diverter switch claimed in claim 17 wherein:

said interface circuitry includes ring detecting means connected to said two telephone signal paths for detecting ringing signals on either of said two telephone signal paths; and said programmed microcontroller causes said switching circuit to connect said subscriber port to the one of said two telephone signal paths on which a ringing signal is occurring when a ringing signal is detected by said ring detecting means.

19. The subscriber telephone diverter switch claimed in claim 18 wherein:

said interface circuitry includes a loop hold circuit;

said switching circuit selectively connects said loop hold circuit to said two telephone signal paths; and said programmed microcontroller causes said switching circuit to connect said loop hold circuit to the one of said two telephone signal paths connected to said subscriber port when said ring detecting means detects a ringing signal on the other of said two telephone signal paths while said subscriber port is connected to said one of said two telephone signal paths.

20. The subscriber telephone diverter switch claimed in claim 17 wherein said switching circuit automatically connects said subscriber port to said signal path for connection to a local exchange carrier (LEC) central office in the event of a power failure.

21. The subscriber telephone diverter switch claimed in claim 17 wherein:

said interface circuitry includes a coupling circuit suitable for detecting when a telephone instrument goes off-hook;

said switching circuit selectively connects said coupling circuit to said subscriber port; and said programmed microcontroller is connected to said coupling circuit for receiving a signal denoting that a telephone instrument connected to said subscriber port has gone off-hook when said coupling circuit detects that a telephone instrument connected to said subscriber port has gone off-hook.

22. The subscriber telephone diverter switch claimed in claim 21 wherein:

said coupling circuit also detects the digits generated by a telephone instrument connected to said subscriber port and forwards said digits to said programmed microcontroller; and said programmed microcontroller causes said switching circuit to connect said subscriber port to one of said two telephone signal paths in response to said digits.

23. The subscriber telephone diverter switch claimed in claim 22 wherein:

said interface circuitry also includes a first loop hold circuit;

said switching circuit selectively connects said first loop hold circuit to said two telephone signal paths; and said programmed microcontroller causes said switching circuit to connect said first loop hold circuit to said one of said two telephone paths.

24. The subscriber telephone diverter switch claimed in claim 23 wherein said programmed microcontroller determines if loop current is present when said switching circuit connects said first loop hold circuit to said one of said two telephone paths.

25. The subscriber telephone diverter switch claimed in claim 24 wherein said programmed microcontroller causes said interface circuitry to transmit the digits generated by said telephone instrument connected to said subscriber port along said one of said two telephone signal paths.

26. The subscriber telephone diverter switch claimed in claim 25 wherein said programmed microcontroller causes said switching circuit to: (i) connect said subscriber port to said coupling circuit while said interface circuitry is transmitting the digits generated by a telephone instrument connected to said subscriber port along one of said two telephone signal paths and; (ii) after all of the digits have been transmitted, connect said subscriber port to said one of said two telephone signal paths.

27. The subscriber telephone diverter switch claimed in claim 26 wherein:

said interface circuitry includes a tone generator;

said coupling circuit connects said tone generator to said subscriber port; and said programmed microcontroller causes said tone generator to generate a dial tone when a telephone instrument connected to said subscriber port goes off-hook prior to when said telephone instrument generates digits.

28. The subscriber telephone diverter switch claimed in claim 27 wherein:

said interface circuitry includes ring detecting means connected to said two telephone signal paths for detecting ringing signals on either of said two telephone signal paths; and said programmed microcontroller causes said switching circuit to connect said subscriber port to the one of said two telephone signal paths on which a ringing signal is occurring when a ringing signal is detected by said ring detecting means.

29. The subscriber telephone diverter switch claimed in claim 28 wherein:

said interface circuitry includes a second loop hold circuit;

said switching circuit selectively connects said second loop hold circuit to said two telephone signal paths; and said programmed microcontroller causes said switching circuit to connect said second loop hold circuit to the one of said two telephone signal paths connected to said subscriber port when said ring detecting means detects a ringing signal on the other of said two telephone signal paths while said subscriber port is connected to said one of said two telephone signal paths.

* * * * *